(12) United States Patent
Sato

(10) Patent No.: US 11,736,200 B2
(45) Date of Patent: Aug. 22, 2023

(54) COMBINATORIAL OPTIMIZATION PROBLEM PROCESSOR AND METHOD

(71) Applicant: Nippon Telegraph and Telephone Corporation, Tokyo (JP)

(72) Inventor: Toshiya Sato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/787,100

(22) PCT Filed: Dec. 23, 2019

(86) PCT No.: PCT/JP2019/050265
§ 371 (c)(1),
(2) Date: Jun. 17, 2022

(87) PCT Pub. No.: WO2021/130800
PCT Pub. Date: Jul. 1, 2021

(65) Prior Publication Data
US 2023/0050876 A1 Feb. 16, 2023

(51) Int. Cl.
*H04B 10/50* (2013.01)
(52) U.S. Cl.
CPC ..... *H04B 10/50575* (2013.01); *H04B 10/506* (2013.01)
(58) Field of Classification Search
CPC .......... H04B 10/50575; H04B 10/506
(Continued)

(56) References Cited

U.S. PATENT DOCUMENTS 11,436,394 B2 * 9/2022 Inaba ................. G06F 17/18
2017/0068632 A1 * 3/2017 Yoshimura .......... G06F 13/4068
(Continued)

OTHER PUBLICATIONS

Li et al; The challenges of modern computing and new opportunities for optics; 2021; Photonix; pp. 1-31. (Year: 2021).*
(Continued)

*Primary Examiner* — Amritbir K Sandhu
(74) *Attorney, Agent, or Firm* — Workman Nydegger

(57) ABSTRACT

A combinatorial optimization problem processing device is for associating a combinatorial optimization problem having N elements with an Ising model to process the combinatorial optimization problem. The combinatorial optimization problem processing device includes: a 1×2 Mach-Zehnder optical modulator that receives a polarized clock pulse train; an optical interference circuit that receives polarized clock pulse trains that were modulated by the Mach-Zehnder optical modulator; an optical coupler that couples output of the optical interference circuit with an initialization optical pulse train that creates a neutral state with respect to interactions between the elements; and a modulation signal generator that performs waveform shaping on an electrical signal obtained by photoelectrically converting an output signal of the optical coupler, generates a modulation signal for the Mach-Zehnder optical modulator, and externally outputs a monitor signal that represents a solution to the optimization problem. The optical interference circuit repeatedly allows a predetermined interaction in the Ising model to occur from the neutral state at a period corresponding to the N pulses of the polarized clock pulse train.

5 Claims, 8 Drawing Sheets

(58) Field of Classification Search
USPC .......................................................... 398/198
See application file for complete search history.

(56) References Cited

U.S. PATENT DOCUMENTS

| | | | | |
|---|---|---|---|---|
| 2017/0351293 | A1* | 12/2017 | Carolan | .................. G06E 3/005 |
| 2019/0019100 | A1* | 1/2019 | Roques-Carmes | .. G06N 3/0675 |
| 2020/0379504 | A1* | 12/2020 | Carolan | .................. G06E 3/003 |
| 2022/0012619 | A1* | 1/2022 | Roques-Carmes | .... G06N 3/084 |
| 2022/0413353 | A1* | 12/2022 | Sato | ........................ G02F 1/212 |
| 2023/0050876 | A1* | 2/2023 | Sato | ........................ G02F 3/028 |

OTHER PUBLICATIONS

Masanao Yamaoka et al., *CMOS Ising Computer that Contributes to the Optimization of Social Systems*, Hitachi Critique, vol. 99, No. 3, 2017, pp. 81-85.

\* cited by examiner

COMBINATORIAL OPTIMIZATION PROBLEM PROCESSOR AND METHOD

TECHNICAL FIELD

The present invention relates to a combinatorial optimization problem processing device and method for deriving a solution to a combinatorial optimization problem.

BACKGROUND ART

A combinatorial optimization problem involves finding a combination of parameters (i.e., a solution) that maximizes (or minimizes) an evaluation index under given conditions. Combinatorial optimization problems can be applied to situations where better selections are required in various fields such as delivery and drug discovery.

In an NP-hard class combinatorial optimization problem, the number of combinations increases exponentially as the number of elements (number of parameters) N in the combination increases, and therefore the fact that finding an optimal solution with a "brute-force method" takes an unrealistic long time has been an issue.

Study is underway to find a solution for this issue. It is known that there is a correspondence between solving a combinatorial optimization problem and finding the most stable energy state of an Ising model. In view of this, NPL 1, for example, discloses a method for substantially solving a combinatorial optimization problem through CMOS semiconductor chip implementation and simulation for a technique for finding the most stable state in an Ising model by a method based on simulated annealing.

CITATION LIST

Non Patent Literature

[NPL 1] Masanao Yamaoka, et al., "CMOS Ising Computer to Help Optimize Social Infrastructure Systems", Hitachi Review, Vol. 99, No. 03, 328-329.

SUMMARY OF THE INVENTION

Technical Problem

However, this conventional method has a problem that finding an optimal solution is time-consuming.

The present invention has been made in view of the foregoing issues, and an object of the present invention is to provide a combinatorial optimization problem processing device and method for finding an optimal solution to a combinatorial optimization problem in a short time.

Means for Solving the Problem

A combinatorial optimization problem processing device according to an aspect of the present invention is a combinatorial optimization problem processing device for associating a combinatorial optimization problem having N elements with an Ising model to process the combinatorial optimization problem, the combinatorial optimization problem processing device including: a 1×2 Mach-Zehnder optical modulator configured to receive a polarized clock pulse train; an optical interference circuit configured to receive polarized clock pulse trains that were modulated by the Mach-Zehnder optical modulator; an optical coupler configured to couple output of the optical interference circuit with an initialization optical pulse train that creates a neutral state with respect to interactions between the elements; and a modulation signal generator configured to perform waveform shaping on an electrical signal obtained by photoelectrically converting an output signal of the optical coupler, generate a modulation signal for the Mach-Zehnder optical modulator, and externally output a monitor signal that represents a solution to the optimization problem, wherein the optical interference circuit repeatedly allows a predetermined interaction in the Ising model to occur from the neutral state at a period corresponding to the N pulses of the polarized clock pulse train.

Also, a combinatorial optimization problem processing method according to an aspect of the present invention is a combinatorial optimization problem processing method performed by a combinatorial optimization problem processing device for associating a combinatorial optimization problem having N elements with an Ising model to process the combinatorial optimization problem, the combinatorial optimization problem processing method including: an optical interference step of inputting polarized clock pulse trains that were modulated by a Mach-Zehnder optical modulator to an optical interference circuit; an optical coupling step of coupling output of the optical interference circuit with an initialization optical pulse train that creates a neutral state with respect to interactions between the elements; and a modulation signal generating step of performing waveform shaping on an electrical signal obtained by photoelectrically converting an optical signal generated in the optical coupling step, generating a modulation signal for the Mach-Zehnder optical modulator, and externally outputting a monitor signal that represents a solution to the optimization problem, wherein the optical interference step and the modulation signal generating step are executed such that a predetermined interaction in the Ising model is repeatedly allowed to occur from the neutral state at a period corresponding to the N pulses of the polarized clock pulse train.

Effects of the Invention

According to the present invention, an optimal solution to a combinatorial optimization problem can be found in a short time.

DESCRIPTION OF EMBODIMENTS

Before describing embodiments of the present invention, the following briefly describes an Ising model and a combinatorial optimization problem.

Ising Model

Figure 1:
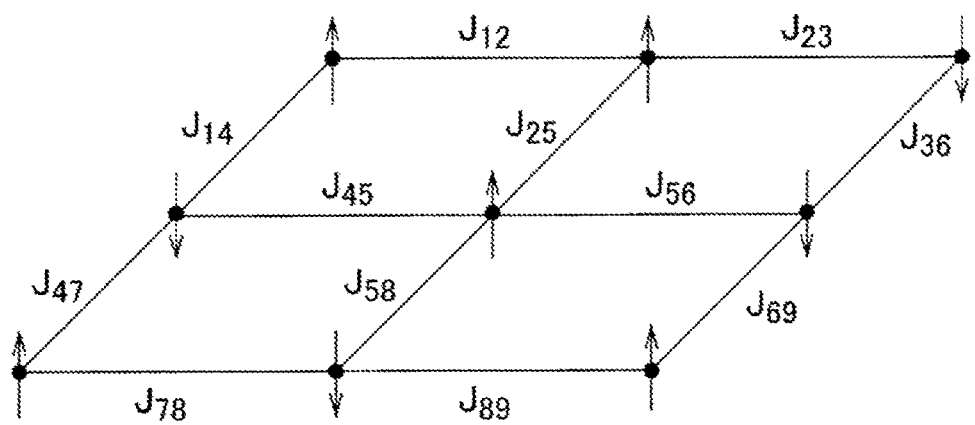
FIG. 1 is a diagram showing an Ising model.

FIG. 1 shows an Ising model. An Ising model is a statistical mechanics model that represents the properties of magnetic materials (ferromagnets, antiferromagnets, etc.). It is made up of lattice points that take either up or down spin states, and becomes stable when the energy H is the lowest in consideration of interactions between adjacent lattice points.

In numerical calculation performed using a method such as a neural network, an Ising model is expressed by spin states $\sigma_i$ of the lattice points, interaction coefficients $J_{ij}$ that represent the strength of interactions between pairs of spin states, and external magnetic field coefficients $h_i$ that represent the strength of an externally applied magnetic field. The energy H of the Ising model can be expressed by the following expression.

Math 1

$$H = -\sum_{<i,j>} J_{ij}\sigma_i\sigma_j - \sum h_j\sigma_j \quad (1)$$

In the Ising model, the spin states are shifted until the energy H is minimized. By mapping a problem such that the evaluation index of the combinatorial optimization problem corresponds to the energy of an Ising model and then allowing the Ising model to converge, it is possible to find a combination of spin states that minimizes the energy. In other words, this means finding a combination of parameters that minimizes the evaluation index of the original optimization problem.

Note that optimization simulators commonly called Ising model machines have been extended to consider interactions not only between adjacent lattice points but also between all lattice points.

Combinatorial Optimization Problem

Figure 2:
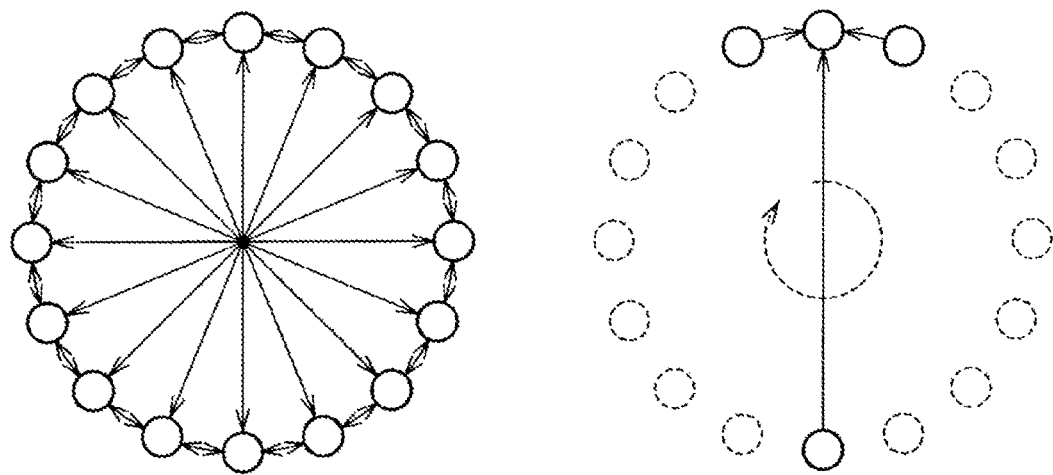
FIG. 2 is a diagram schematically showing an example of a combinatorial optimization problem.

FIG. 2 is a diagram schematically showing an example of a combinatorial optimization problem called a Max-Cut-3 problem with N=16. The circles shown in FIG. 2 represent the N=16 elements.

A Max-Cut-3 problem is a problem of maximizing the total weight of cut edges when elements are grouped into two groups. Here, "3" means the number of interactions in the Ising model.

The right side of FIG. 2 is a diagram schematically showing interactions. The figure on the right side shows an example of interacting with three elements, namely the elements directly ahead and behind (±1) and the element eight places ahead (−8). Note that the interactions in a Max-Cut-3 problem with N=16 are not limited to this example.

Combinatorial optimization problem processing devices according to embodiments of the present invention will be described below by way of example of solving the combinatorial optimization problem shown in FIG. 2. Hereinafter, embodiments of the present invention will be described with reference to the drawings. Like reference numerals denote like objects in the drawings, and redundant descriptions will not be given.

First Embodiment

Figure 3:
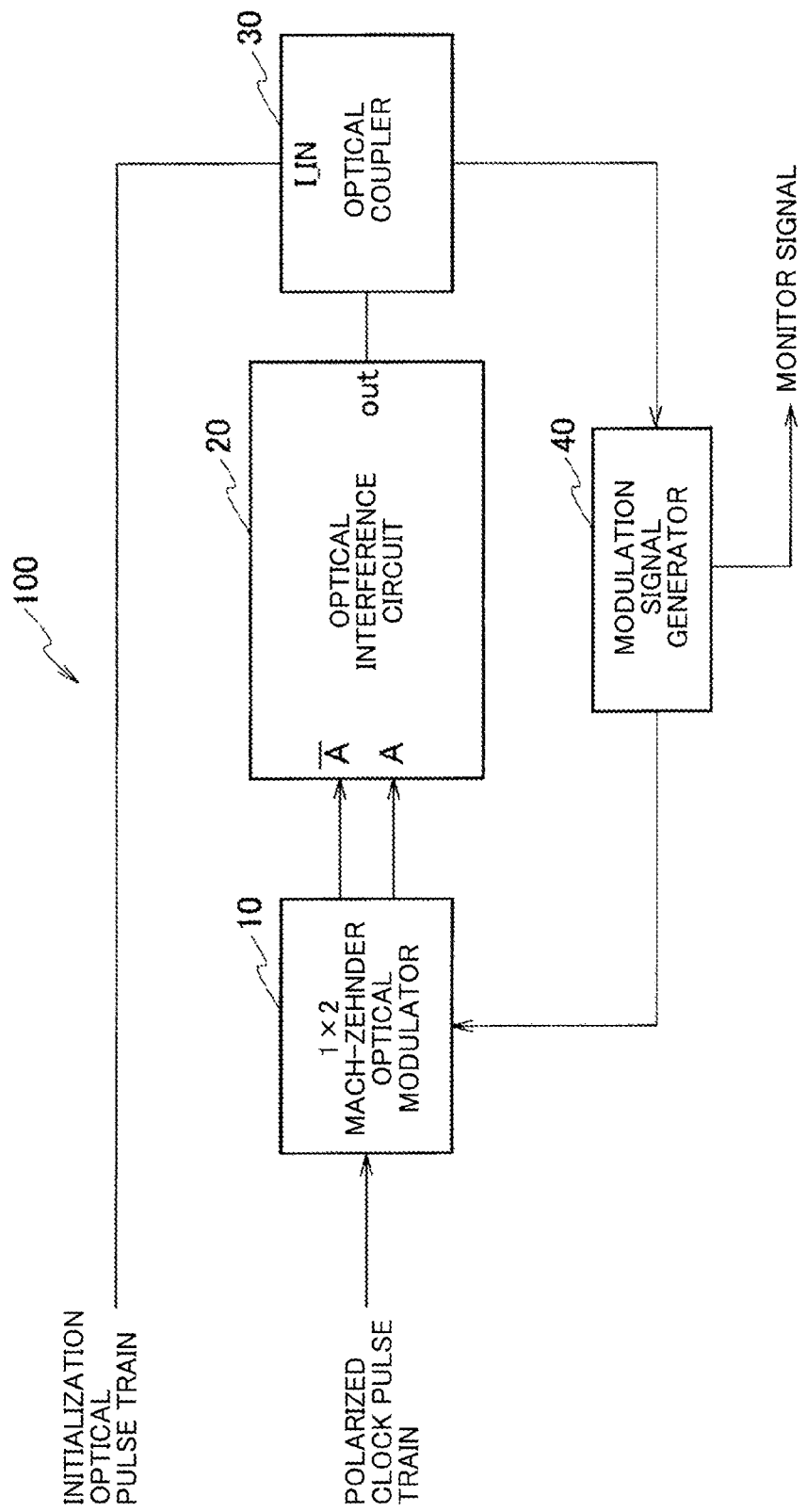
FIG. 3 is a diagram showing an example of a functional configuration of a combinatorial optimization problem processing device according to a first embodiment of the present invention.

FIG. 3 is a diagram showing an example of the functional configuration of a combinatorial optimization problem processing device according to a first embodiment of the present invention. A combinatorial optimization problem processing device 100 shown in FIG. 3 includes a 1×2 Mach-Zehnder optical modulator 10, an optical interference circuit 20, an optical coupler 30, and a modulation signal generator 40.

The "1×2" in "1×2 Mach-Zehnder optical modulator 10" means one input and two outputs. Note that the 1×2 Mach-Zehnder optical modulator 10 is a commonly-available one. The notation "1×2" will be omitted in the following description.

The Mach-Zehnder optical modulator 10 receives a polarized coherent clock pulse train (hereinafter, the term "coherent" will be omitted). The Mach-Zehnder optical modulator 10 adjusts a fixed phase condition such that the following expression holds.

Math 2

$$\emptyset_{i+N}=\sin^2(\pi\emptyset_i) \quad (2)$$

A polarized clock pulse train that was modulated by the Mach-Zehnder optical modulator 10 and output from A, A⁻, or both is input to the optical interference circuit 20. Note that the correct notation for A⁻ is shown in FIG. 3, and the same applies hereinafter.

Here, in the present embodiment, each pulse i of the polarized clock pulse train corresponds to one element of the combinatorial optimization problem. Accordingly, a set of N=16 pulses according to Expression 2 can be regarded as one series.

Here, there are N series, namely i, i+N, i+2N, . . . as one series, (i+1), (i+1)+N, (i+1)+2N, . . . as another series, (i+(N−1)), (i+(N−1))+N, (i+(N−1))+2N, . . . as another series, and so on.

By allowing the above-described interaction between the pulse trains of each series, it is possible to realize the combinatorial optimization problem processing device 100 that solves the Max-Cut-3 problem with N=16, for example.

Figure 4:
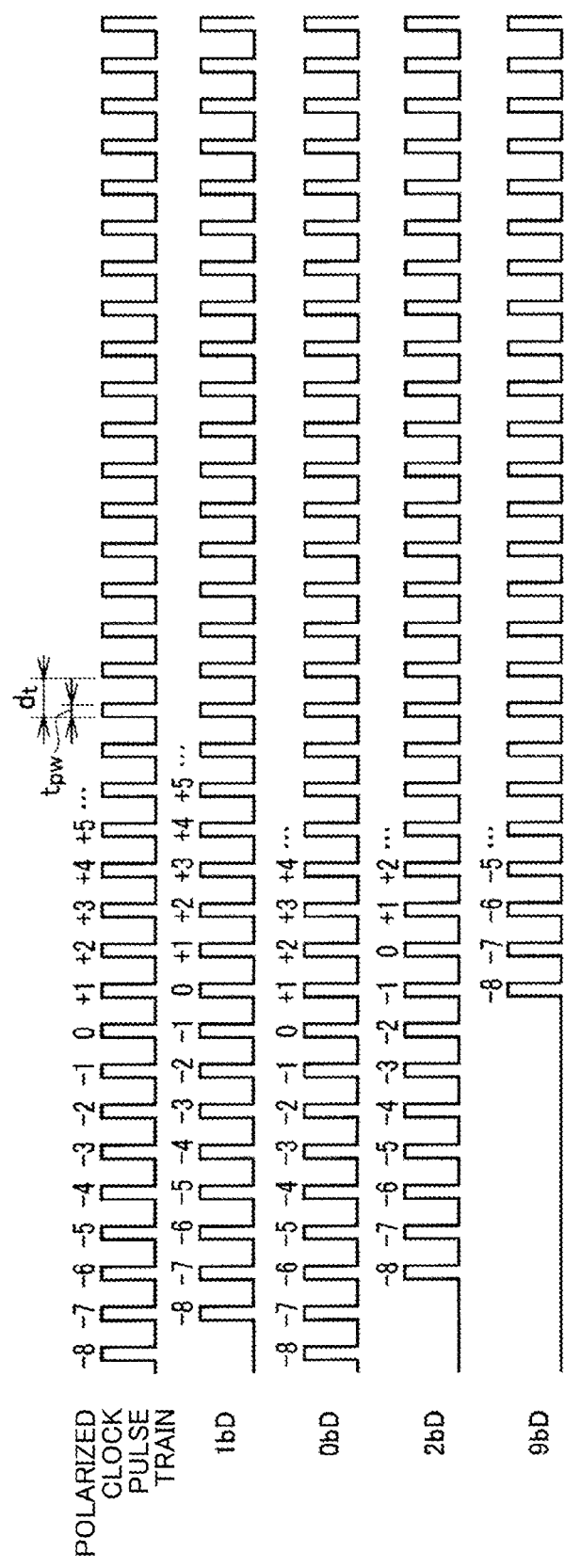
FIG. 4 is a diagram showing a specific example of an optical interference circuit shown in FIG. 3.

FIG. 4 is a time chart illustrating relationships between series. In FIG. 4, the horizontal direction represents time, the first line in the vertical direction is the polarized clock pulse train input to A⁻ of the optical interference circuit 20 for example, the second line is a pulse train 1bd resulting from the polarized clock pulse train of the first line being delayed by one polarized clock pulse, the third line is a pulse train 0bd that is the non-delayed polarized clock pulse train of the first line, the fourth line is a pulse train 2bd resulting from the polarized clock pulse train of the first line being delayed by two polarized clock pulses, and the fifth line is a pulse train 9bd resulting from the polarized clock pulse train of the first line being delayed by nine polarized clock pulses. Note that for the purpose of making the description easier to understand, identification numbers −8, −7, −6, . . . , −1, 0, +1, +2, +3, . . . are assigned from the left side of the polarized clock pulse train.

Let us now focus on the 17th pulse with the identification number 0, which is the pulse i of the pulse train 1bd that has been cycled by 16 pulses. The pulse with the identification number 0 is the first pulse in terms of the period of N pulses.

The pulse numbers of the pulses at the same timing as this first pulse in the other pulse trains 0bD, 2bD, and 9bD are respectively +1, −1, and −8. In other words, the timing of the pulse with identification number 0 matches the timing of the +1 pulse that is one pulse ahead, the −1 pulse i=18 (16th) that is two pulses behind, and the −8 pulse that is eight pulses behind.

By allowing interference between these polarized pulses in the optical interference circuit 20, interaction $Q_{AF}$ expressed by the following expression can occur.

Math 3

$$Q_{AF:i} = -\Sigma^{i-k} J_{i:k}(\sqrt{\varnothing_i} - \sqrt{(1-\varnothing_{i+k})}) \quad (3)$$

Here, i is the serial number of the pulses that make up the polarized clock pulse train, k is a number representing the position of the pulse among the N pulses, and $J_{i:k}$ is a coefficient representing the magnitude of the interaction. Note that the second term in (•) on the right side of Expression 3 corresponds to the other A⁻ output of the Mach-Zehnder optical modulator 10. Expression 3 represents an antiferromagnetic interaction.

Note that in the above example, there is more than one k. For example, k=+1, k=−1, and k=−8. The values of k correspond to the interactions shown in the right figure of FIG. 2.

The power of the polarized clock pulse train output by the optical interference circuit 20 can be expressed by the following expression.

Math 4

$$\varnothing_{i+N} = \sin^2\pi|\sqrt{\varnothing_i} - Q_{AF:i}|^2 \quad (4)$$

In this way, if the output light pulses derived from the polarized clock pulse train from the Mach-Zehnder optical modulator 10 are input to the optical interference circuit 20, it is possible to generate a polarized clock pulse train influenced by desired interaction.

Optical Interference Circuit

Figure 5:
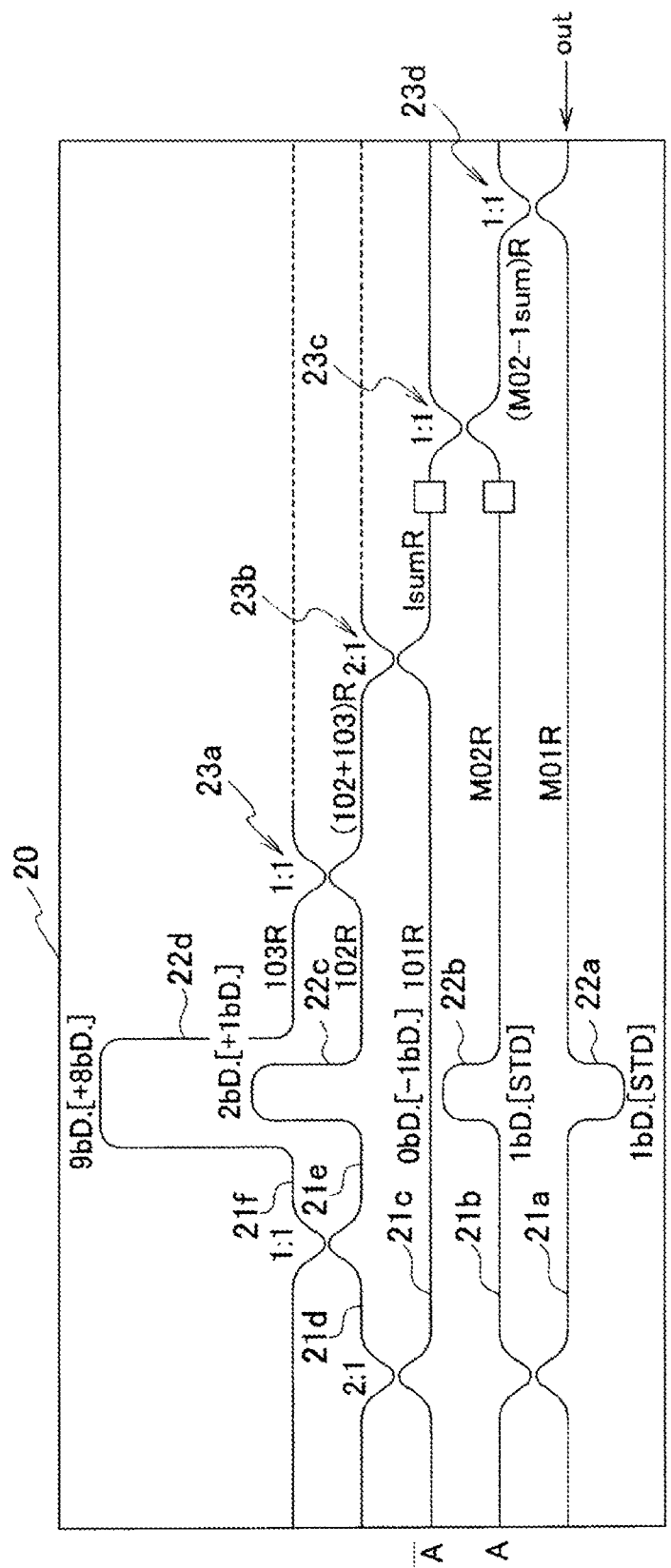
FIG. 5 is a diagram showing polarized clock pulse trains delayed by delay units of the optical interference circuit shown in FIG. 4.

FIG. 5 is a diagram showing a specific example of the optical interference circuit 20. As shown in FIG. 5, the optical interference circuit 20 includes a plurality of delay units including a first delay unit 22a, a second delay unit 22b, a third delay unit 22c, and a fourth delay unit 22d; a plurality of optical waveguides including a first main pathway 21a, a second main pathway 21b, a first action pathway 21c, a second action pathway 21e, and a third action pathway 21f; and a plurality of optical couplers including a first optical coupler 23a, a second optical coupler 23b, a third optical coupler 23c, and a fourth optical coupler 23d.

The first delay unit 22a receives one polarized clock pulse train branched from the one polarized clock pulse train A that was modulated by the Mach-Zehnder optical modulator 10, and delays the polarized clock pulse train in units of pulses. In this example, the polarized clock pulse train is delayed by one pulse. The first main pathway 21a propagates the first polarized clock pulse train 1bD that was delayed by one pulse in the first delay unit 22a.

The second delay unit 22b receives the other polarized clock pulse train branched from the one polarized clock pulse train A that was output by the Mach-Zehnder optical modulator 10, and delays the polarized clock pulse train by the same number of pulses as the first delay unit. The second main pathway 21b propagates the first polarized clock pulse train 1bD that was delayed by the same number of pulses as the first delay unit.

The first action pathway 21c receives one third polarized clock pulse train 0bD that was branched from the other polarized clock pulse train A⁻ that was modulated by the Mach-Zehnder optical modulator 10, and propagates the third polarized clock pulse train 0bD as it is.

The third delay unit 22c receives one polarized clock pulse train branched from the other polarized clock pulse train A⁻ that was output by the Mach-Zehnder optical modulator 10, and delays the polarized clock pulse train in units of pulses. In this example, the polarized clock pulse train is delayed by two pulses. The second action pathway 21e propagates the fourth polarized clock pulse train 2bD, which is the result of the one polarized clock pulse train branched from the polarized clock pulse train A⁻ being delayed by two pulses.

The fourth delay unit 22d receives the one polarized clock pulse train branched from the polarized clock pulse train A⁻, and delays the polarized clock pulse train in units of pulses. In this example, the polarized clock pulse train is delayed by nine pulses. The third action pathway 21f propagates the fifth polarized clock pulse train 9bD, which is the result of the other polarized clock pulse train branched from the polarized clock pulse train A⁻ being delayed by nine pulses.

The first optical coupler 23a allows interference such that the amplitudes of the optical signals of the third action pathway 21f and the second action pathway 21e are added. The second optical coupler 23b allows interference such that the amplitudes of the output optical signal of the first optical coupler 23a and the optical signal of the first action pathway 21c are added.

The third optical coupler 23c allows interference such that the amplitudes of the output optical signal of the second optical coupler 23b and the optical signal of the second main pathway 21b are subtracted. The fourth optical coupler 23d allows interference such that the amplitudes of the output optical signal of the third optical coupler 23c and the optical signal of the first main pathway 21a are subtracted.

According to the optical interference circuit 20 described above, the interactions shown in the right figure of FIG. 2 can occur. By changing the combination of delay amounts of the first to fourth delay units 22a to 22d, it is also possible to allow interactions between different combinations of elements.

In the present embodiment, a neutral state, in which the magnitude of the relationships between the elements is not biased, is produced before the above-mentioned interactions are allowed to occur. The neutral state is produced by the optical coupler 30 and an initialization optical pulse train.

The optical coupler 30 couples the initialization optical pulse train, which is for creating a neutral state for interactions between the elements, with the output signal of the optical interference circuit. The initialization pulse train is a pulse train in which the effective peak power of the polarized clock pulse is ½. Besides the effective peak power, a pulse width $t_{pw}$, a pulse interval $d_r$, and the like are the same as those of the polarized clock pulse train.

The initialization optical pulse train is input to the I_IN terminal of the optical coupler 30 and coupled with the output optical signal of the optical interference circuit 20. At the first timing when the initialization optical pulse train is input, the signal level of the output optical signal of the optical interference circuit 20 is 0.

For this reason, only the initialization optical pulse train is input to the modulation signal generator 40. The modulation signal generator 40 includes a photoelectric converter, a pre-amplifier, a Bessel filter, a power splitter, and a post-amplifier, for example. These functional units are not illustrated.

The photoelectric converter performs photoelectric conversion on the initialization optical pulse train to obtain an initialization pulse train that is an electrical signal. The pre-amplifier amplifies the electrical signal initialization pulse train. The Bessel filter is one type of low-pass filter, and increases the pulse width of the electrical signal that makes up the initialization pulse train.

The power splitter externally outputs a monitor signal obtained by tapping the initialization pulse train output from the Bessel filter. The output signal of the power splitter is amplified by the post-amplifier and connected to the modulation terminal of the Mach-Zehnder optical modulator 10.

The polarized clock pulse train is input to the Mach-Zehnder optical modulator 10 in synchronization with the timing when the first pulse of the initialization optical pulse train arrives at the modulation terminal of the Mach-Zehnder optical modulator 10. At this time, the timings of the pulses that make up the polarized clock pulse train are adjusted so as to be approximately at the center of the pulse width range of the initialization pulse signal widened by the Bessel filter. This timing adjustment may be performed with either the polarized clock pulse train or the initialization optical pulse train.

When the polarized clock pulse and the initialization pulse train are input to the Mach-Zehnder optical modulator 10 at this timing, the neutral state (symmetric state) is created in which the magnitudes of the relationships between the elements corresponding to the N=16 pulse sequences are 0. Thereafter, the previously described interactions occur naturally and spontaneously in the optical interference circuit 20 due to "fluctuation" such as noise, and thus a phenomenon occurs in which symmetry is broken and a stable state when regarded as an Ising model occurs.

In this way, the solution to the combinatorial optimization problem can be found by reading the stable state when regarded as an Ising model that appears due to an emergent phenomenon beyond commonly-called reductionist understanding. The "state" corresponding to the stable state when regarded as an Ising model can be obtained by observing the monitor signal output by the modulation signal generator 40.

Variation

Figure 6:
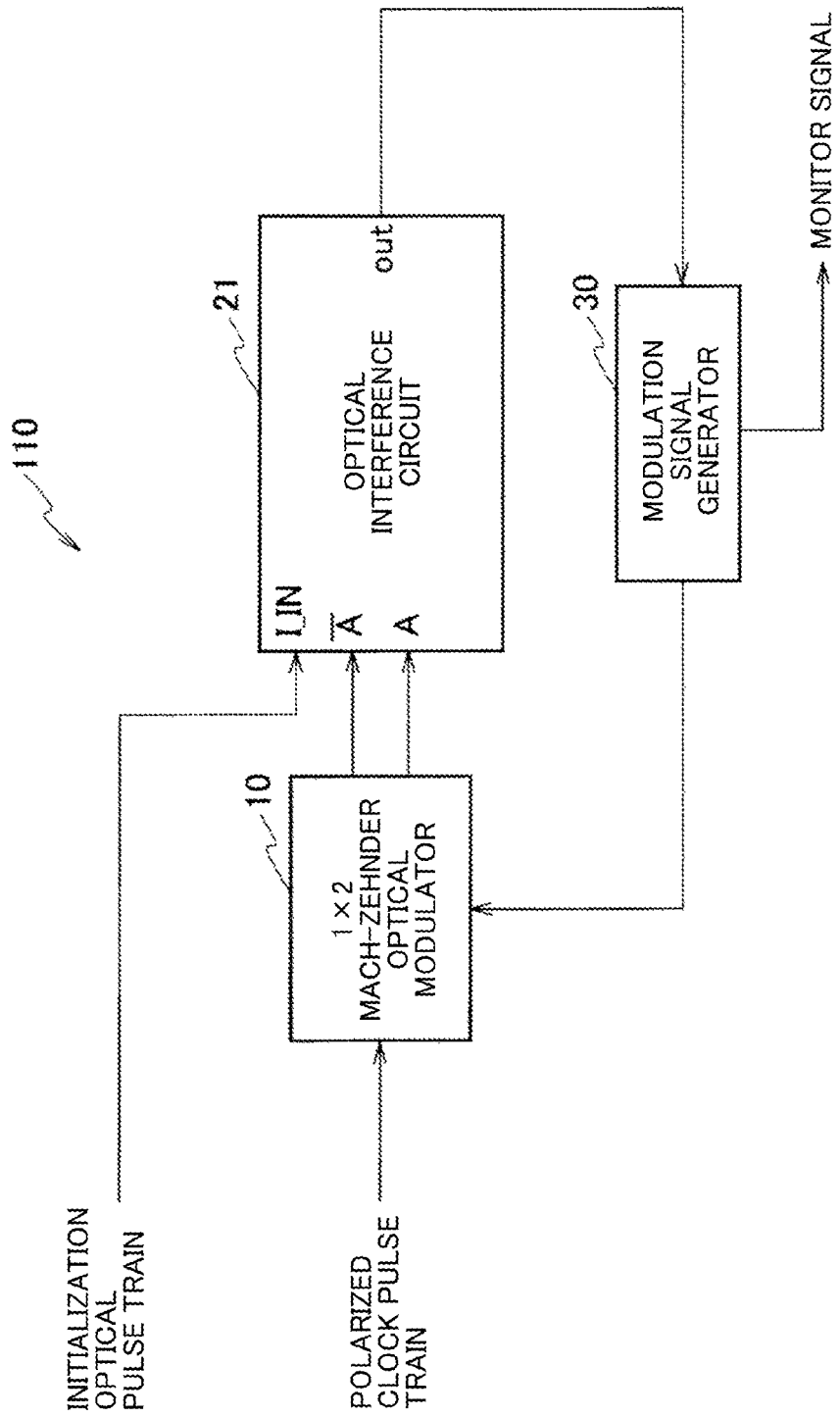
FIG. 6 is a diagram showing a variation of the combinatorial optimization problem processing device shown in FIG. 3.

FIG. 6 is a diagram showing an example of the functional configuration of a combinatorial optimization problem processing device according to a variation obtained by modifying the above first embodiment. The combinatorial optimization problem processing device 110 shown in FIG. 6 differs from the combinatorial optimization problem processing device 100 (FIG. 3) in that it does not include the optical coupler 30.

In the combinatorial optimization problem processing device 100, the initialization pulse train is input to the I_IN terminal of the optical interference circuit 21. The I_IN terminal of the optical interference circuit 21 is the free input terminal of the 2-input optical coupler (not denoted by a reference numeral) that receives the one polarized clock pulse train A output by the Mach-Zehnder optical modulator 10. Other than this different portion, the configuration of the optical interference circuit 21 is the same as that of the optical interference circuit 20.

The combinatorial optimization problem processing device 110 of this variation has the same operations and effects as the combinatorial optimization problem processing device 100 (FIG. 3).

Second Embodiment

Figure 7:
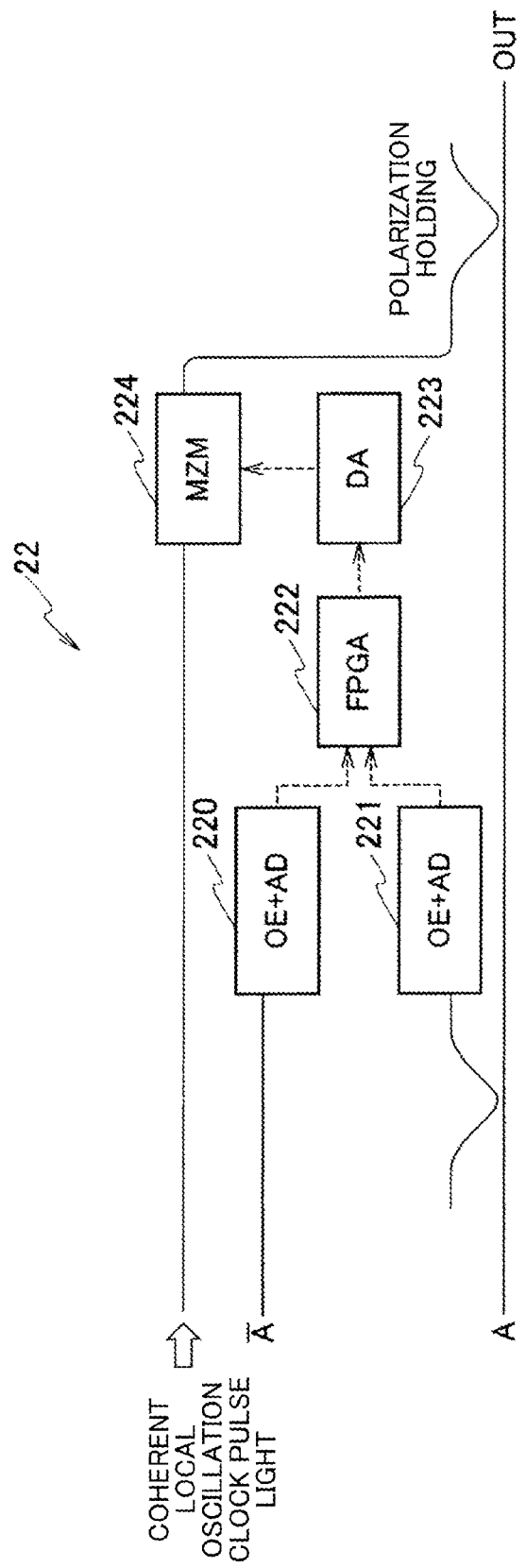
FIG. 7 is a diagram showing an optical interference circuit included in a combinatorial optimization problem processing device 200 according to a second embodiment of the present invention.

FIG. 7 is a diagram showing an optical interference circuit included in a combinatorial optimization problem processing device 200 according to a second embodiment of the present invention. The combinatorial optimization problem processing device 200 is not illustrated.

FIG. 7 shows the case where the optical interference circuit 21 according to the variation (FIG. 6) includes an FPGA and a Mach-Zehnder optical modulator. The optical interference circuit 22 shown in FIG. 7 includes a photoelectric AD converter 220, a photoelectric AD converter 221, an FPGA 222, a DA converter 223, and a Mach-Zehnder optical modulator 224.

The photoelectric AD converter 220 performs AD conversion on an electric pulse signal obtained by photoelectrically converting the polarized clock pulse train $A^-$. The photoelectric AD converter 221 performs AD conversion on an electric pulse signal obtained by photoelectrically converting the polarized clock pulse train A.

The FPGA 222 performs digital processing for calculation of the above-described interactions (FIG. 2). The output signal of the FPGA 222 is subjected to DA conversion and connected to the modulation signal terminal of the Mach-Zehnder optical modulator 224.

The Mach-Zehnder optical modulator 224 uses the output signal of the FPGA 222 to perform intensity modulation on coherent local oscillation clock pulse light. The coherent local oscillation clock pulse light can be provided as a pulse train branched from the above-described polarized clock pulse train by a directional coupler (not shown).

The OUT terminal shown in FIG. 7 corresponds to the OUT terminal shown in FIG. 6. In other words, the optical interference circuit 22 shown in FIG. 7 has the same operation as the optical interference circuit 21 shown in FIG. 6. As described above, the optical interference circuit 22 can also be configured including a semiconductor integrated circuit such as an FPGA.

Demonstration Experiment

A demonstration experiment was conducted for the purpose of confirming effects of the embodiments. In the demonstration experiment, the combinatorial optimization problem processing device 100 according to the first embodiment of the present invention was configured, a polarized clock pulse train having a total time width of up to 1 µs was used, and a Max-Cut-3 problem with N=16 (FIG. 2) was solved. Note that in this observation, the trial start time was 62.033 µs after the reference observation time.

Figure 8A:
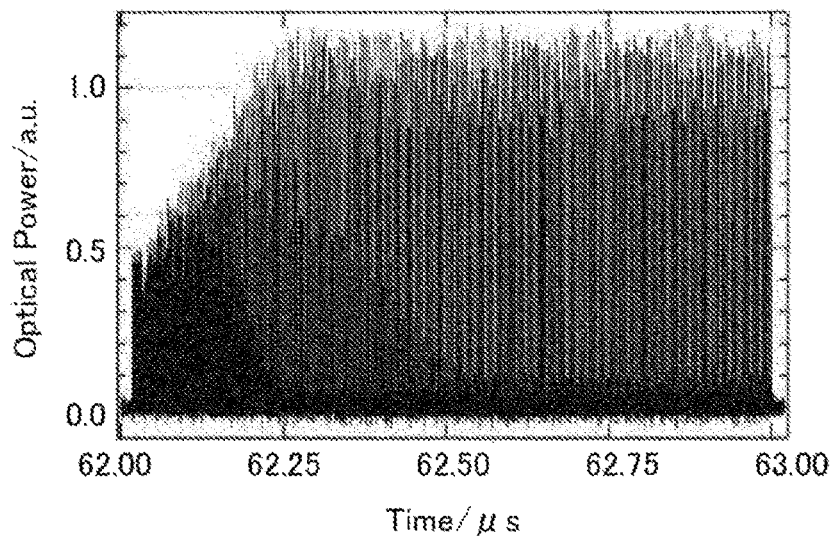
FIG. 8 is a diagram showing results of a demonstration experiment in which a combinatorial optimization problem was solved using the combinatorial optimization problem processing device shown in FIG. 3.
Figure 8B:
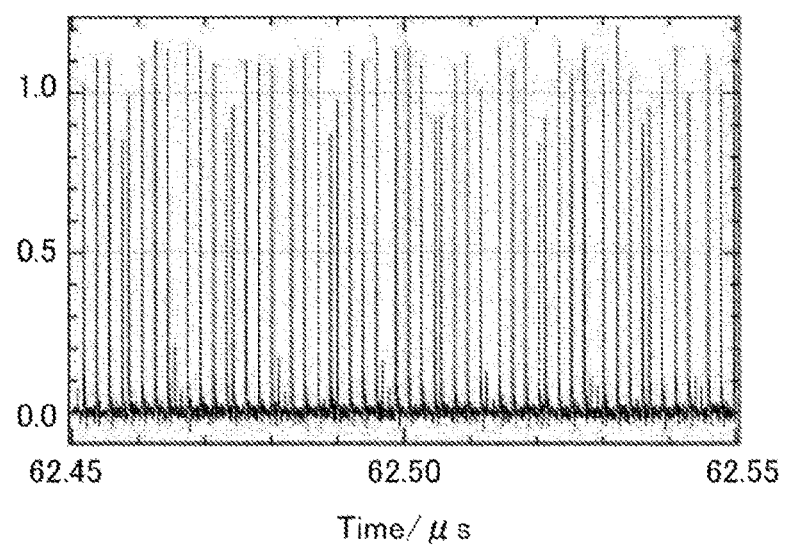

FIG. 8 is a diagram showing solution results of the demonstration experiment. The horizontal axis in FIG. 8 represents time (µs), and the vertical axis represents the power of the monitor signal (FIG. 3). FIG. 8(b) is an enlarged view of the range from 62.45 to 62.55 µs in FIG. 8(a).

The initialization optical pulse train was input at 62.033 µs. Immediately after the input of the initialization optical pulse train, the monitor signal shows a neutral state with a power of about 0.5. Thereafter, the monitor signal changes toward the stabilized state of the Ising model due to the influence of interactions produced by the optical interference circuit 20.

At 62.5 µs, the stable state is nearly achieved, and the 0/1 pattern of "0010101011010101" was obtained. This pattern is one optimal solution to the Max-Cut-3 problem with N=16.

In this way, the combinatorial optimization problem processing device 100 of the present embodiment can solve the Max-Cut-3 problem with N=16 in the short time of about 500 ns. It has been reported that the method of NPL 1 required a time of 672 μs.

As described above, according to the combinatorial optimization problem processing device 100 of the present embodiment, an optimal solution to a combinatorial optimization problem can be obtained in a short time.

The present invention is not limited to the above embodiments, and can be modified without departing from the scope of the gist of the invention. Although the Max-Cut-3 problem with N=16 has been illustrated as an example of a combinatorial optimization problem, the present invention is not limited to this example. The present invention can be applied to any combinatorial optimization problem as long as the combinatorial optimization problem can be mapped to correspond to energy states in an Ising model. Also, the interactions of the Max-Cut-3 problem with N=16 are not limited to the above example.

As described above, it goes without saying that the present invention includes various embodiments not described here. Accordingly, the technical scope of the present invention is defined only by invention specifying matter pertaining to a reasonable scope of patent claims based on the above description.

REFERENCE SIGNS LIST

10 1×2 Mach-Zehnder optical modulator
20,21,22 Optical interference circuit
30 Optical coupler
40 Modulation signal generator
100,110,200 Combinatorial optimization problem processing device

The invention claimed is:

1. A combinatorial optimization problem processing device for associating a combinatorial optimization problem having N elements with an Ising model to process the combinatorial optimization problem, the combinatorial optimization problem processing device comprising:
   a 1×2 Mach-Zehnder optical modulator configured to receive a polarized clock pulse train;
   an optical interference circuit configured to receive polarized clock pulse trains that were modulated by the Mach-Zehnder optical modulator;
   an optical coupler configured to couple output of the optical interference circuit with an initialization optical pulse train that creates a neutral state with respect to interactions between the N elements; and
   a modulation signal generator configured to perform waveform shaping on an electrical signal obtained by photoelectrically converting an output signal of the optical coupler, generate a modulation signal for the 1×2 Mach-Zehnder optical modulator, and externally output a monitor signal that represents a solution to the optimization problem,
   wherein the optical interference circuit repeatedly allows a predetermined interaction in the Ising model to occur from the neutral state at a period corresponding to the N pulses of the polarized clock pulse train.

2. The combinatorial optimization problem processing device according to claim 1,
   wherein the optical interference circuit includes:
   a first main pathway that includes a first delay unit configured to receive a first polarized clock pulse train that was branched from one polarized clock pulse train modulated by the Mach-Zehnder optical modulator, and delay the first polarized clock pulse train in units of pulses of the first polarized clock pulse train,
   a second main pathway that includes a second delay unit configured to receive a second polarized clock pulse train that was branched from the polarized clock pulse train, and delay the second polarized clock pulse train by the same number of pulses as the first delay unit,
   a first action pathway configured to receive a third polarized clock pulse train that was branched from another polarized clock pulse train modulated by the Mach-Zehnder optical modulator, and propagate the third polarized clock pulse train, and
   a second action pathway that includes a third delay unit configured to receive a fifth polarized clock pulse train that was branched from a fourth polarized clock pulse train that was branched from the other polarized clock pulse train modulated by the Mach-Zehnder optical modulator, and delay the fifth polarized clock pulse train in units of pulses of the fifth polarized clock pulse train.

3. The combinatorial optimization problem processing device according to claim 1,
   wherein letting N be the number of elements, i be a serial number of each pulse of the polarized clock pulse train, $J_{i:k}$ be a coefficient representing a magnitude of the predetermined interaction, and k be a number representing a position of a pulse among the N pulses that is different from i, the predetermined interaction $Q_{AF}$ is expressed by the following expression, and $$Q_{AF:i} = -\sum_{}^{i \neq k} J_{i:k}(\sqrt{\phi_i} - \sqrt{(1-\phi_{i+k})})$$

a power of the polarized clock pulse train is expressed by the following expression:

$$\emptyset_{i+N} = \sin^2\pi|\sqrt{\emptyset_i} - Q_{AF:i}|^2 \qquad \text{Math 6}$$

4. The combinatorial optimization problem processing device according to claim 2,
   wherein letting N be the number of elements, i be a serial number of each pulse of the polarized clock pulse train, $J_{i:k}$ be a coefficient representing a magnitude of the predetermined interaction, and k be a number representing a position of a pulse among the N pulses that is different from i, the predetermined interaction $Q_{AF}$ is expressed by the following expression, and $$Q_{AF:i} = -\sum_{}^{i \neq k} J_{i:k}(\sqrt{\phi_i} - \sqrt{(1-\phi_{i+k})})$$

a power of the polarized clock pulse train is expressed by the following expression:

$$\emptyset_{i+N} = \sin^2\pi|\sqrt{\emptyset_i} - Q_{AF:i}|^2 \qquad \text{Math 6}$$

5. A combinatorial optimization problem processing method performed by a combinatorial optimization problem processing device for associating a combinatorial optimization problem having N elements with an Ising model to process the combinatorial optimization problem, the combinatorial optimization problem processing method comprising:
   an optical interference step of inputting polarized clock pulse trains that were modulated by a Mach-Zehnder optical modulator to an optical interference circuit;

an optical coupling step of coupling output of the optical interference circuit with an initialization optical pulse train that creates a neutral state with respect to interactions between the N elements; and a modulation signal generating step of performing waveform shaping on an electrical signal obtained by photoelectrically converting an optical signal generated in the optical coupling step, generating a modulation signal for the 1×2 Mach-Zehnder optical modulator, and externally outputting a monitor signal that represents a solution to the optimization problem, wherein the optical interference step and the modulation signal generating step are executed such that a predetermined interaction in the Ising model is repeatedly allowed to occur from the neutral state at a period corresponding to the N pulses of the polarized clock pulse train.

* * * * *